United States Patent [19]
Dischert et al.

[11] 4,074,307
[45] Feb. 14, 1978

[54] SIGNAL PROCESSOR USING CHARGE-COUPLED DEVICES

[75] Inventors: Robert Adams Dischert, Burlington; Robert Norman Hurst, Cherry Hill; Arch Clinton Luther, Jr., Woodstown, all of N.J.

[73] Assignee: RCA Corporation, New York, N.Y.

[21] Appl. No.: 604,775

[22] Filed: Aug. 14, 1975

[51] Int. Cl.² ............................................. H04N 5/78
[52] U.S. Cl. ........................................ 358/8; 360/36
[58] Field of Search .................... 360/36; 358/8, 149, 358/19; 178/69.5 TV, 69.5 CB, 6.6 TC

[56] References Cited

U.S. PATENT DOCUMENTS

| | | | |
|---|---|---|---|
| 3,855,424 | 12/1974 | Tharmaratnum et al. | 360/36 |
| 3,860,952 | 1/1975 | Tallent et al. | 358/8 |
| 3,863,022 | 1/1975 | Bruch | 358/8 |
| 3,931,638 | 1/1976 | Lentz et al. | 360/36 |
| 3,932,888 | 1/1976 | Lemke et al. | 360/36 |
| 3,947,874 | 3/1976 | Lentz | 360/36 |
| 3,971,063 | 7/1976 | Michael et al. | 358/8 |
| 3,978,519 | 8/1976 | Stalley et al. | 360/36 |

OTHER PUBLICATIONS

Edwardson, "The Digital Timing Correction of Video Tape Recorded Colour Television Signals," *Proceedings of the Conference on Video and Data Recording*, Birmingham, England, 10-12 July 1973, (IEEE), pp. 27-39.

*Primary Examiner*—John C. Martin
*Attorney, Agent, or Firm*—Eugene M. Whitacre; Mason DeCamillis

[57] ABSTRACT

A time base corrector for removing time base errors from video signal information of a type including synchronizing pulses is provided. A storage means in the form of a charge coupled device (CCD) has the video information coupled to its input. A start-stop oscillator in conjunction with a preset counter coupled to the storage means clocks the video information into the storage means so as to stop the clock when the input signal information has been transferred to the output terminal of the storage means. A local reference restarts the clock and the stored input signal information is clocked out in synchronism with the local reference.

5 Claims, 5 Drawing Figures

SIGNAL PROCESSOR USING CHARGE-COUPLED DEVICES

The present invention relates to the processing of television signals and in particular to the processing of television signals to remove time base errors introduced during recording, reproduction or transmission of such signals.

Time base correctors (TBC) in general function to controllably delay a television signal so that timing errors (jitter) may be removed by suitably modifying the delay through which the signal is being passed.

Known forms of time base correctors have provided this variable delay in the form of fixed inductors and variable capacitors, the latter in the form of voltage variable capacitors. A delay line constructed in this manner typically provided 3 $\mu$ sec of video delay which could be changed ± ½ microsecond. To achieve longer delays, methods of switching in and out groups of fixed delay lines were used with the resultant difficulties of matching the various sections of the delay line as well as eliminating the video variations introduced by the in and out switching of the delay line sections. Still other forms of time base correctors have been built using relatively complex digital techniques wherein high-speed A to D conversion and banks of digital stores (memory) provided means for converting the video signal to digital form and delaying the bits thus obtained. Conversion of the video information to digital form provided means for using digital shift registers for obtaining variable delay, however, several, typically, eight shift registers in parallel are needed to provide the delay paths required for the digitally encoded video. D to A conversion is also required to restore the delayed signal to analog form.

The recent development of charge coupled devices (CCD's) operating as analog shift registers gave rise to a number of methods of utilizing the CCD as a shift register without the need for complex A to D and D to A conversion. A detailed discussion of CCD's, their construction and uses as shift registers is shown, for example, in U.S. Pat. No. 3,758,794. Although U.S. Pat. No. 3,758,794 deals with the form of CCD known generally as surface channel type, the teaching is equally applicable to the newer form of CCD construction known generally as buried channel type.

Application of CCD's in strict analogy to digital shift registers to provide time base correction results in the analog video signal being applied to the input of the CCD wherein the signal is clocked through the CCD by clock pulses derived from a variable frequency oscillator (VFO) whose frequency is varied by phase comparison with the incoming synchronizing signal components against a stable reference.

The error signal from the phase comparison is used to make the VFO period proportional to the magnitude of the phase error. Since the delay of the CCD is proportional to the period of the clock pulses, the delay correction is proportional to the phase error and therefore to the jitter on the incoming signal from which the phase error is derived.

The advantages and apparent simplicity of a time base corrector constructed in this manner are overshadowed by inherent problems related to the variable frequency oscillator clock operation of the CCD. Since the normal video signal contains color subcarrier at 3.58 MHz and since the clock pulse rate is limited by practical considerations to frequencies not too different in value (i.e., 10 MHz), severe moire patterns caused by beats between subcarrier and clock frequency occur in the output video (and resultant picture). This beat problem is further aggravated in that the delay variation is being accomplished by clock pulse frequency variation (period) so that the beats move, appear, and disappear as a function of the instantaneous delay correction. Although the beats can be virtually eliminated by locking the clock to a multiple of the color subcarrier, such an arrangement produces a fixed delay and the apparatus will no longer be of use as a time base corrector.

Additional operating difficulties occur in signal processing using a VFO with a CCD which relates to the limits imposed by the Nyquist sampling theorem. This familiar theorem states that the highest frequency that can be passed by any coupled system is one-half the sample rate, thus, for example, a 5 MHz sampled system could have no proper response above 2.5 MHz. In general, the shape of the bandwidth is in the form $(\sin x)/x$. Clocking the CCD at a variable rate results in a low bandwidth when the clocking frequency is lowered (long delay) and a higher bandwidth when the clocking frequency increases (short delay) resulting in a time base corrector wherein the bandwidth of the system is a function of the amount of delay correction applied.

In accordance with the present invention, a time base corrector for removing time base errors from video signal information of a type including synchronizing pulses, comprises storage means, including a predetermined number of sequentially arranged storage elements and having an input terminal to be coupled to a source of signal representative of the video signal information to be corrected and an output terminal providing corrected signals representative of the video signal information. The storage means are responsive to clock pulses for transferring the signals through successive storage elements from the input terminal to the output terminal. A start/stop oscillator is coupled to the storage means and timing signal means coupled to the start/stop oscillator start the operation of the oscillator to provide clock pulses to the storage means. A triggerable counter which, after being triggered on, stops the oscillator after the number of clock pulses necessary to transfer a signal from the input terminal to the last of said sequentially arranged storage elements. Synchronizing pulse separator means are coupled to receive the video signal to be corrected and to the counter to start the counter at a predetermined time during the line period of the video signal, whereby the portion of the video signal occurring at the predetermined time is stored at the last of the sequentially arranged storage elements.

The present invention will be better understood by reference to the accompanying drawing and specification in which.

Description Of The Invention

Figure 1:
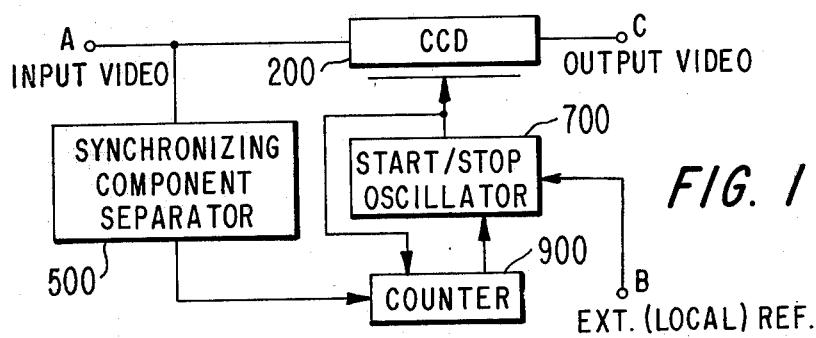
FIG. 1 is a block diagram of a time base corrector embodying the present invention.

In FIG. 1, a composite video signal containing image information and synchronizing components is applied to an input video terminal (A) which is coupled to a CCD 200 (preferably of the buried channel construction—e.g., Fairchild, CCD 311) and a synchronizing component separator 500. When the horizontal synchronizing component appears in the video input signal, it is separated by separator 500. The output signal of sync separator 500 corresponding to the leading edge of horizontal sync is further delayed within sync separator 500 for the duration of the incoming sync component to insure that the output signal of sync separator 500 is coincident with the leading edge of the video image information portion of the composite video signal and applied to counter 900 (constructed, for example, with a T174193 integrated circuit). Oscillator 700 (constructed, for example with an MC 4024 integrated circuit) has its output terminal coupled to CCD 200 which causes the video signal applied to the input of CCD 200 to be clocked into the CCD at the constant rate of one stage of the CCD per clock pulse of oscillator 700. Counter 900, which is preset to the number of stages of the CCD, counts in synchronism with oscillator 700 until the preset number of clock pulses is reached at which time the oscillator 700 is stopped which in turn stops the clocking into the CCD of the video input signal. Since the beginning of counting in counter 900 was determined by the output of sync separator 500 which corresponds to the leading edge of the jittering input horizontal synchronizing component delayed to the beginning of the video image information and since the number of preset counts equals the number of stages in CCD 200, the beginning of the line of video image information will be clocked all the way through CCD 200 and will be ready to spill out on the next clock pulse. However, since oscillator 700 was stopped by counter 900, the input video signal is stored in CCD 200 with the beginning of the line of video image information ready to come out the instant the clock pulses are re-applied to CCD 200.

Clock pulses from oscillator 700 are re-applied to CCD 200 by the occurrence of a local reference timing signal applied to oscillator 700 which causes clocking to begin again. Since the input video signal was stored in the CCD with the beginning of the video image information ready to spill out on the next clock pulse, and since the clocking is recommenced by the occurrence of the local reference signal leading edge, CCD 200 will clock out its stored video image information signal with the beginning of the horizontal television line synchronous with local reference, thus achieving time base correction. By way of example, the use of 10.7 MHz for oscillator 700 and 621 stages for CCD 200 yields a storage capacity of 58.04 microseconds according to the general expression $T = n/f$, where T is the storage capacity and f is the clock frequency and n equals the number of stages. Thus, 58.04 microseconds of the 63.55 microsecond horizontal line (according to U.S. standards) can be stored in CCD 200. On the average, 5.5 microseconds are lost during the blanking interval. It is the ability to vary this lost time that permits the apparatus of FIG. 1 to operate as a TBC. In summary, the input video signal is stored with the leading edge of the video image portion of the composite video signal located at the output terminal of CCD 200 waiting for the local sync reference to tell it to come out. It waits a variable length of time, depending on whether it was early or late arriving at its storage position as determined by the amount of jitter. During this wait, up to 5.5 microseconds of unwanted video is offered to the line and lost. The use of a gated clock in the form of oscillator 700 allows the use of a constant clock frequency for the variable delay and overcomes both the moire (beat) problems as well as the Nyquist bandwidth limitation problems as described above.

As described, the apparatus of FIG. 1 is entirely satisfactory for monochrome signals; however, when color video signals are to be processed, a higher degree of resolution of the input time base error is required. In some prior art systems, the output of a first TBC was considered to be coarse corrected from horizontal sync and a subsequent TBC corrected by the color burst error was cascaded to make the fine corrections. Although such systems are workable, they have the disadvantage of subjecting the signal to degradation by multiple processing by virtue of the cascading of the coarse and fine TBC stages.

To obtain fine correction for color with the apparatus of FIG. 1, the horizontal synchronizing component separator 500 is replaced by a synchronizing component separator which is capable of detecting a selected burst crossover of the color synchronizing component signal.

Figure 5:
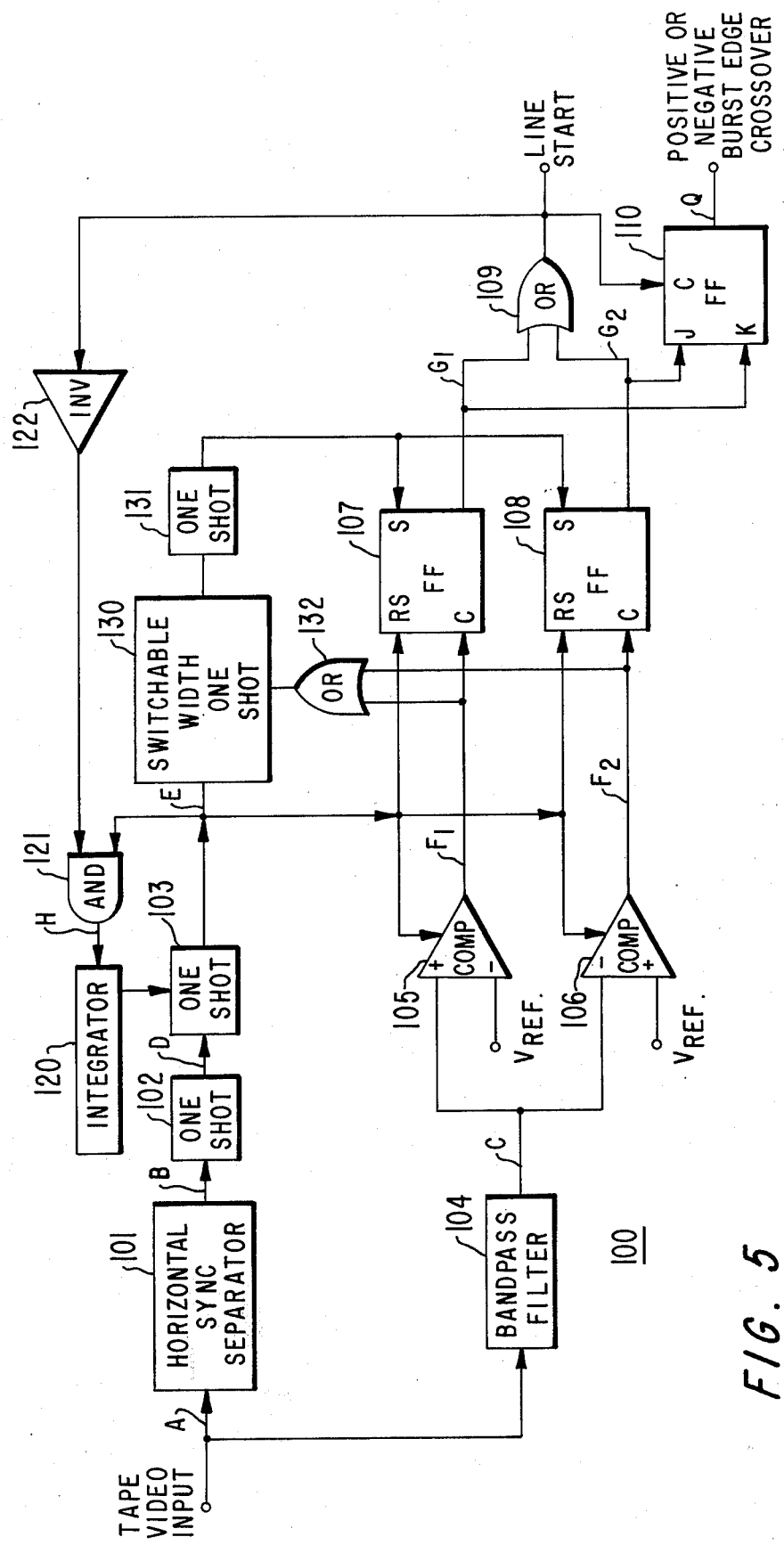
FIG. 5 is a block diagram of a synchronizing circuit for use with the present invention.

A synchronizing system suitable for synchronizing component separator 500 is illustrated in FIG. 5 and described in detail in the co-pending application, Ser. No. 604,670, now U.S. Pat. No. 4,024,571, of R. A. Dischert et al. assigned to the same assignee and filed concurrently herewith entitled SYNCHRONIZING SYSTEM. Briefly, the synchronizing circuit 100 of FIG. 5 operates as follows: the incoming input video synchronizing components in the form of horizontal sync and color burst are separated; the leading edge of horizontal sync is used to develop a timing signal (E) which is compared with the positive or negative burst signal from a bandpass filter 104 tuned to the subcarrier frequency in a first 105 and second 106 comparator. The comparators are arranged to drive respective flip flops 107, 108 at a selected burst crossover (the first negative going burst cycle near the end of the original burst signal). The output signals of the flip flops 107, 108 are combined in a gate circuit 109 to provide an output signal (line start) which contains the leading edge of horizontal sync information corrected to a specific color burst crossover. In the absence of a color burst signal, flip flops 107, 108 are driven by signal generating means (130, 131) initiated by horizontal sync (E) to maintain a line start signal. The presence of a color burst signal effectively disables the substitute signal generator 130, 131 by means of OR gate 132. Since the line start signal is gated by the horizontal sync pulse, it occurs at the horizontal rate, yet it has all of the timing accuracy of averaged burst from bandpass filter 104. This line start signal when applied to counter 900 provides a high accuracy counter start signal corrected for averaged burst signal error.

Having made a fine correction to the horizontal sync component for the purpose of starting the count of N stages of the CCD in counter 900 of FIG. 1, it is necessary to also correct the start time of the oscillator when readout is desired. This is required because the identical clock is used for clocking-out and clocking-in the image information to the CCD. When the errors in the time base signal are not in increments of whole clock pulses, the line start signal from the sync component separator 500 may occur anywhere within one clock pulse width. Although of no consequence in the apparatus of FIG. 1 or FIG. 2 when used for monochrome signals, this residual error when handling color signals is sufficient to prevent proper lockup for color signals. This particular problem may be overcome as shown in FIG. 2 by a ramp generator 710 and an oscillator start delay circuit 720 which operate as follows.

On the occurrence of an input signal sync component, a line start signal which has been fine corrected to include the averaged burst timing information is coupled to counter 900 and ramp generator 710. Ramp generator 710 (which may consist, for example, of a constant current charging circuit) begins to run immediately and continues until the first count (determined by the first available clock pulse) appears in counter 900 at which time the ramp generator is stopped. The magnitude of the ramp output signal is proportional to the time that the ramp generator 710 was allowed to run until the first count of counter 900 occurred and represents a time resolution of 0 to 1 clock pulse of the time the first clock pulse was applied to the CCD. The output terminal of ramp generator 710 is coupled to delay circuit 720, which may be in the form of a one shot delay circuit. Since the external reference (terminal B) is coupled to the start oscillator 700 by means of delay circuit 720, the clock start for readout of CCD 200 is delayed in proportion to the input time resolution which was within one clock pulse. Thus, the clock-out of information from CCD 200 is made to be coincident with the clock-in (start count) time which provides the proper color time base stabilization.

Figure 2:
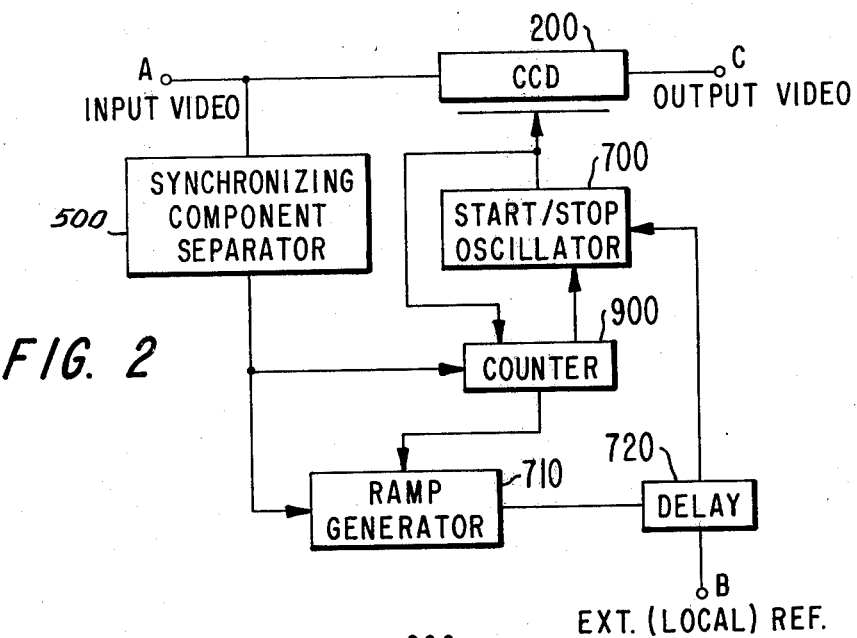
FIG. 2 is a block diagram of a second embodiment of the present invention.
Figure 3:
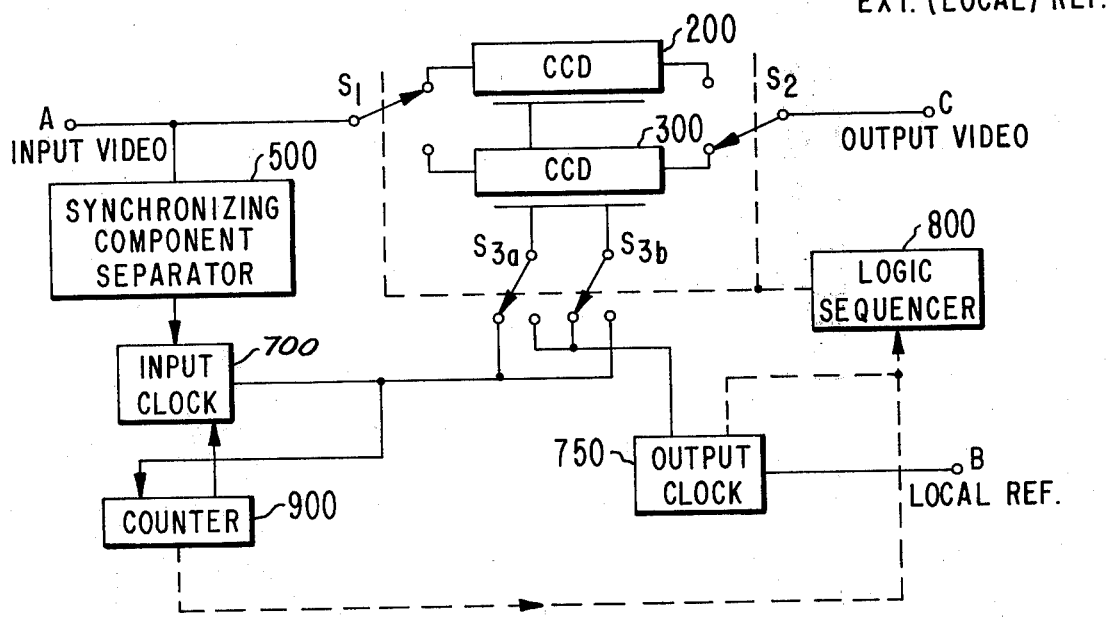
FIGS. 3 and 4 are block diagrams of further embodiments of the present invention.

Although complete in every respect, the apparatus of FIGS. 1 and 2 is limited in its application as a TBC because the input and output clocks are not independent and the amount of time base correction is equivalent to one television line of insertion delay and approximately 3 microseconds of correction. A TBC of extended delay and increased flexibility is shown in FIG. 3. In FIG. 3, two CCD delay lines 200, 300 are used. The sync component separator 500, oscillator 700 and counter 900 are similar to those used in FIGS. 1 and 2. In operation, a first television line is clocked into CCD 200 (via terminal A) until CCD 200 is completely filled. The in-clocking is ied to the subcarrier rate of the jittering input signal as in FIGS. 1 and 2. When counter 900 indicates that CCD 200 is completely filled (leading edge of image information sync in last stage of the CCD), the input video signal and input clock are switched by switches $S_1$ and $S_3$ to CCD 300 and the next television line is clocked into CCD 300 again at the incoming jitter rate. While the second line is being clocked in, the first CCD 200 which holds the first television line is coupled to the output video line (terminal C) and the output clock 750 by switches $S_2$ and $S_3$. The out-clocking is completely independent of the in-clocking and since the out-clocking is coupled to local reference (terminal B), the jitter of the input signal is no longer present and the time base is stabilized.

The load/unload alternation between CCD 200 and CCD 300 continues with inputs, outputs, and clocks being appropriately switched as shown by switches $S_1$, $S_2$, $S_3$. It is understood that these switching devices are only schematically shown to possess the switching arms illustrated. In the preferred embodiments, the switching devices are well known pulse operated electronic switching elements under control of logic sequencer 800. Logic sequencer 800 determines the proper switching functions by relating the status of output signals from counter 900, i.e., end of count and output clock 750, i.e. start count. The TBC of FIG. 3 yields one television line of insertion delay and approximately 10 microseconds of correction range.

Figure 4:
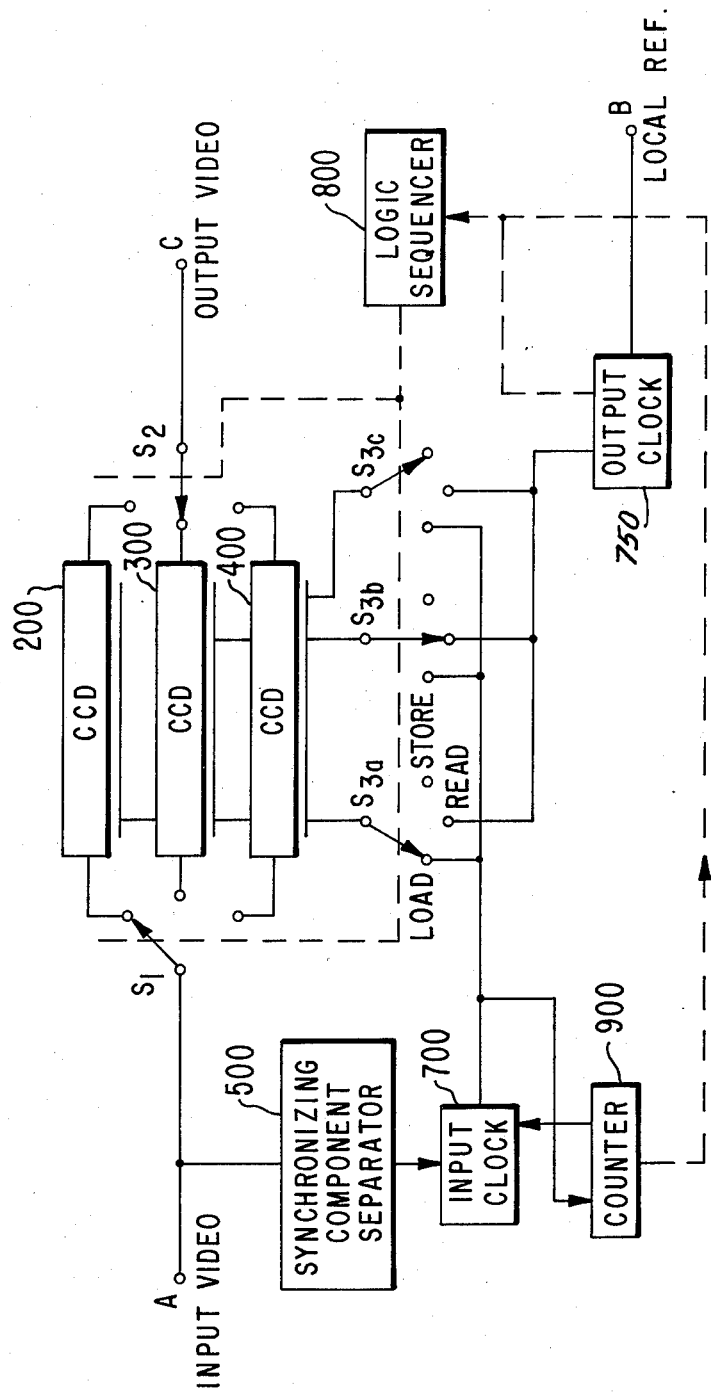

In FIG. 4 the TBC of FIG. 3 is illustrated using a third CCD 400 to provide a still further range of one television line of insertion and one television line of delay. The triple CCD configuration of FIG. 3 can be extended indefinitely, limited only by the diffusion erasure of static CCD charges, thus making a 525 (by U.S. standards) line CCD frame store feasible.

What is claimed is:

1. A time base corrector for removing time base errors from video signal information of a type including synchronizing pulses, comprising:

storage means including a predetermined number of sequentially arranged storage elements and having an input terminal to be coupled to a source of signals representative of said video signal information to be corrected and an output terminal for providing corrected signals representative of said video signal information, said storage means responsive to clock pulses for transferring said signals through successive storage elements from said input terminal to said output terminal;

a start/stop oscillator coupled to said storage means to apply clock pulses thereto;

timing signal means responsive to an external source of synchronizing signal components coupled to said start/stop oscillator for providing a first reference signal for starting the operation of said oscillator to provide clock pulses to said storage means;

a triggerable counter which, after being triggered on, stops said oscillator after the number of clock pulses necessary to transfer a signal from said input terminal to the last of said sequentially arranged storage elements; and synchronizing pulse separator means coupled to receive said video signal to be corrected and to said counter for providing a second reference signal for starting said counter at a predetermined time during each active line period of said video signal, whereby the portion of said video signal occurring at said predetermined time is stored at the last of said sequentially arranged storage elements.

2. A time base corrector according to claim 1 wherein said storage means comprises a charge coupled storage device (CCD).

3. A time base corrector according to claim 2 wherein the storage delay of said storage means is a product of the number of predetermined storage elements and the period of said start/stop oscillator.

4. A time base corrector according to claim 3 wherein said timing signal means comprises a source of local reference signals having horizontal synchronizing component signals.

5. A time base corrector according to claim 4 wherein said triggerable counter is preset to the number of said sequentially arranged storage elements.

* * * * *